United States Patent [19]
Guedalia

[11] Patent Number: 5,515,111
[45] Date of Patent: May 7, 1996

[54] METHOD AND SYSTEM FOR PRODUCING ENHANCED OUTPUT SIGNALS

[75] Inventor: Jacob Guedalia, Jerusalem, Israel

[73] Assignee: Age Computational Graphics, Ltd., Jerusalem, Israel

[21] Appl. No.: 189,481

[22] Filed: Jan. 28, 1994

[30] Foreign Application Priority Data

Jan. 31, 1993 [IL] Israel ......................................... 104568

[51] Int. Cl.⁶ .................................................. H04N 7/133
[52] U.S. Cl. ........................ 348/427; 348/395; 348/408; 348/674; 358/432; 358/447; 395/114
[58] Field of Search .................................. 348/395, 403, 348/408, 607, 627, 674, 608; 358/432, 447; 395/114, 163; 382/56; 341/143, 110; H04N 7/133

[56] References Cited

U.S. PATENT DOCUMENTS 4,807,029  2/1989  Tanaka ............................ 348/400
5,161,015  11/1992  Citta et al. ...................... 348/627
5,164,727  11/1992  Zakhor et al. ................... 341/143
5,229,864  7/1993  Moronaga et al. ............... 358/432

FOREIGN PATENT DOCUMENTS 9111074  7/1991  WIPO ............................... H04N 7/00

Primary Examiner—James J. Groody
Assistant Examiner—Jeffrey S. Murrell
Attorney, Agent, or Firm—Jones & Askew

[57] ABSTRACT

There is provided a system and a method thereof for producing enhanced signals from an irreversible compression first processor in which there were performed irreversible compression encoding of signals and subsequently a compression decoding thereof. The method includes defining at least two sets of signals, wherein each set contains signals having a selected property of a signal, feeding the decoded signals of the first processor to a second processor, and processing the decoded signals by the method of projection onto convex sets, thereby imposing conformity to the sets of signals.

9 Claims, 2 Drawing Sheets

METHOD AND SYSTEM FOR PRODUCING ENHANCED OUTPUT SIGNALS

BACKGROUND OF THE INVENTION

1. Field of the Invention

This invention relates to a method of, and a system for producing enhanced output signals or signal images having certain desired properties (hereinafter referred to as signals) from an irreversible compression processor.

2. Description of the Prior Art

Many signals contain an enormous amount of information components which is desirable to compress as much as possible before recording or transmitting it. One method of signal compression that has been widely applied, is that of irreversible compression processing, such as orthogonal transform compression.

The irreversible compression may consist of the removal of parts of the information, for example, features which are of lesser visual importance, such as high frequency components of an image, and thereafter, encoding the reduced information through an entropy encoding scheme, e.g., Huffman coding. Such procedures, that are characterized by removal and reduction of information, can cause irreversible degradation in the quality of the output signal, which is proportional to the signal compression ratio.

In U.S. Pat. No. 4,807,029, there is proposed a method of reconstructing images from compression-processed image signals. The method described in this patent consists of using certain characteristics of the noise from training image signals to reconstruct the original image signals from the compression-processed signals.

There is also known an image reconstruction technique by which correction of signals can be achieved by the method of Projection Onto Convex Sets (POCS). This method consists of defining at least two sets of signals each containing specific a priori desired characterisitics of enhanced signals. The intersection of these sets represents an enhanced signal having said desired characteristics. Starting from an initial signal that has one of the desired characterisitics and hence satisfies constraints of one set, by progressively approaching the intersection point of these sets, the signal is enhanced. This technique can be implemented by either a direct one step method or by iteratively alternating orthogonal projections from one set onto the other and back.

The method of the present invention may utilize the method described in the U.S. patent, or any other known per se method for producing enhanced output signals from irreversible compression signals without altering the characterising features of the signals. The proposed method achieves an enhanced output signal by using a priori information about: (i) the original input signals; (ii) any precompression encoding processing of the original input signals which may have taken place, and (iii) the characteristics of the irreversible compression processor that is employed. The a priori information can, for example, include general information, such as a restriction to a certain number of bits per pixel and/or it can be a particular property of a specific signal, such as, a particular value at a specific point of the signal.

The enhancement of signals is achieved by a POCS method or technique that increases the degree by which the signals conform to the constraints that are implied by all of the a priori information. The enhanced signals may exactly satisfy all of the constraints or only a greater degree thereof.

SUMMARY OF THE INVENTION

A broad object of the present invention is to provide a method and a system that produces enhanced signals from an irreversible compression processor.

Another object of this invention is to provide a method and a system for increasing the signal compression ratio while retaining a certain quality of the output signal.

In accordance with the present invention, there is therefore provided in a method for producing enhanced signals from an irreversible compression first processor in which there were performed irreversible compression encoding of signals and subsequently a compression decoding thereof, the improvement comprising defining at least two sets of signals, wherein each set contains signals having a selected property of a signal, feeding the decoded signals of said first processor to a second processor, and processing said decoded signals by the method of projection onto convex sets thereby imposing the constraints that define the sets of signals.

The invention further provides a system for producing enhanced signals from an irreversible compression first processor in which were performed irreversible compression encoding of signals and subsequently a compression decoding thereof, the improvement comprising means for defining at least two sets of signals, each set containing signals having a known property of an output signal, and a second processor connected for receiving said sets of signals from said first processor and being of the kind which processes signals by the method of projection onto convex sets, for further processing of said decoded signals from said first processor thereby imposing conformity to said sets of signals.

With the method and system outlined above, the quality of the final output signals is superior to the standard compression processed signal obtained at the same compression ratio, from an irreversible compression processor of the prior art. Therefore, it becomes possible to markedly increase the signal compression ratio, while maintaining high quality of the final output signals.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DESCRIPTION OF THE PREFERRED EMBODIMENT

Figure 1:
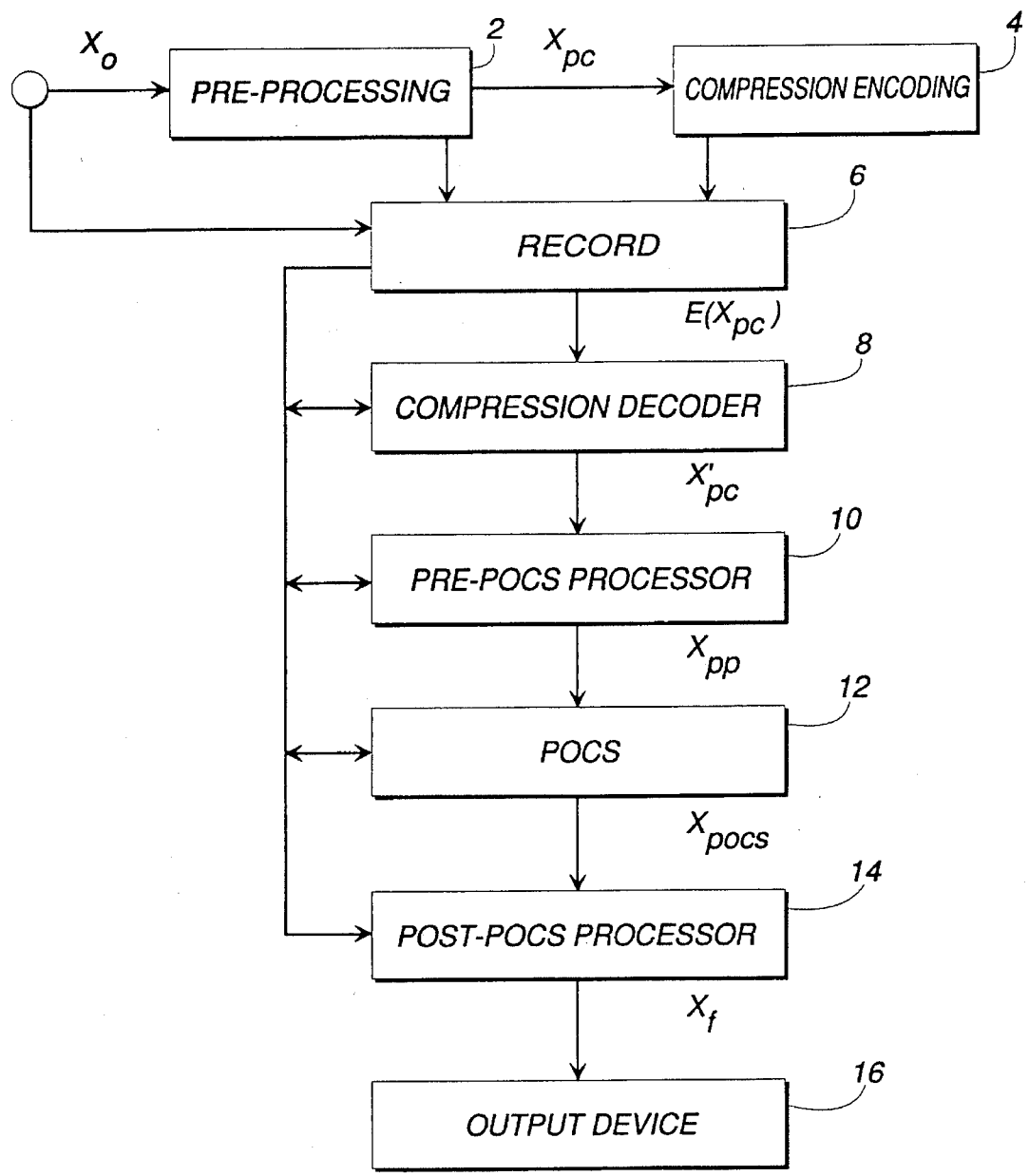
FIG. 1 is a block diagram showing a system for enhancing the output signals from an irreversible compression processor, in accordance with the present invention.

Referring to FIG. 1, there is illustrated a block diagram showing a system for carrying out a method of enhancing decompressed signals by the POCS method in accordance with the present invention. As seen, $X_o$ represents an original signal, which is applied to a pre-compression processor 2 that may leave the signal unchanged or alternatively, perform pre-compression processing for improvement of image compression, such as effecting smoothing of the input signal to remove noise, or for the improvement of the effectiveness of the reconstruction method, such as effecting compression of the dynamic range to produce stronger constraints (i.e., such a processor 2 will introduce a constraint to a specific compressed dynamic range) for the subsequent stage of POCS processing. The pre-compression processed signal $X_{pc}$ is applied to a signal compression circuit 4 and subject therein to irreversible compression encoding. The encoded signal $E(X_{pc})$ is recorded on a recording medium, for example, an optical disk or magnetic disk, in a recording and reproducing apparatus 6. In addition, all, or some of the a priori characteristics of the signal may also be recorded thereon. When desired the encoded signal $E(X_{pc})$ is sent to a decoder circuit 8. The decoder signal $X'_{pc}$ is sent to a post compression-decoding processor or pre-POCS processor 10, that prepares the signal for effective reconstruction by the POCS method. The processor 10 may leave the signal unchanged or may alter it, for example, by low pass filtering the signal in order to remove distortions introduced by the signal compression circuitry due to the nature of the encoding scheme. Such alternations may take into account some or all of the a priori characteristics of the enhanced signals. The post-processed compression-decoded signal, $X_{pp}$, is fed to a POCS circuit 12 for enhancement by maximizing the conformity with a set of constraints defined in circuit 11. The constraints imposed by the POCS circuit 12 are due to some or all of the following types of a priori information: (i) standard information that is independent of a particular signal that is being processed. For example, all signals representing the intensity distribution of a picture or images may be assumed to consist of positive values, or some standard set of processors included in circuits 2 through 10 may imply some standard constraints and, (ii) a priori information that pertains to the characteristics of the original input signal and may be read by the POCS circuit 12 from the recording and reproducing apparatus 6 or passed directly from any circuits 8 through 14 for the purpose of defining the constraints.

Figure 2:
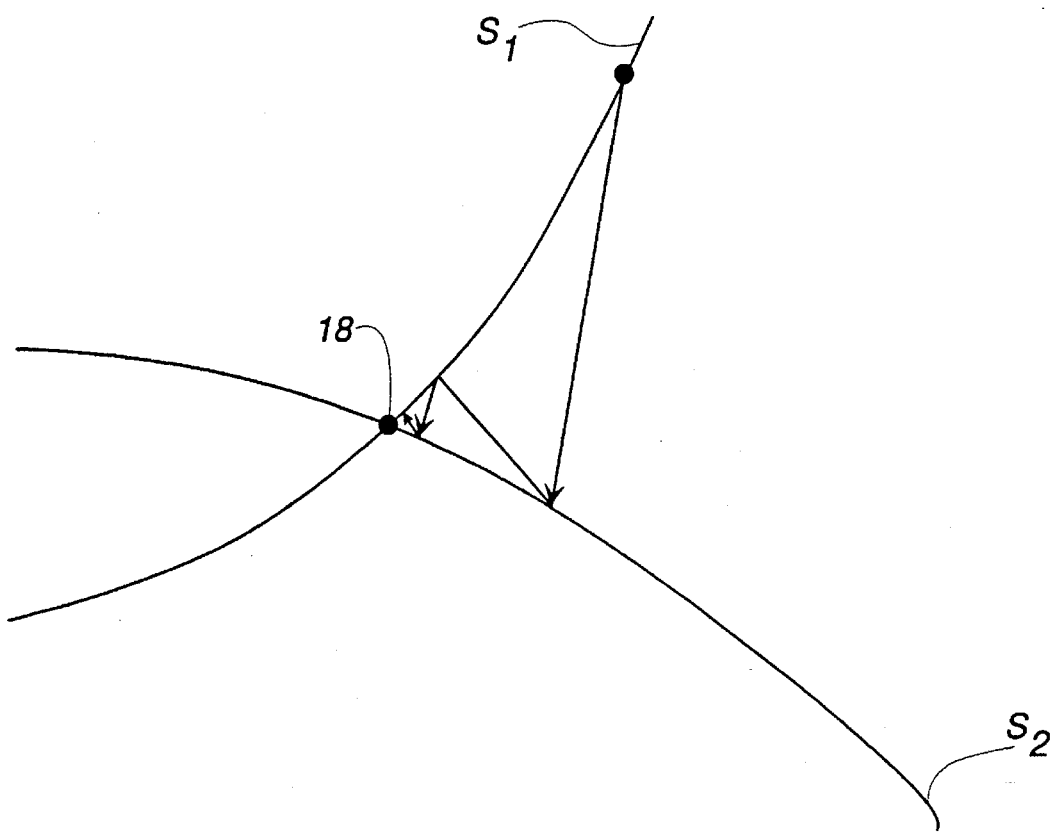
FIG. 2 is a graphic representation of the POCS method for utilization in accordance with the present invention.

Referring now also to FIG. 2, there is illustrated an example of a POCS method, e.g., the Gerchberg method for super resolutions. If a signal has undergone low pass filtering in a frequency space, namely, consists of only a finite set of low frequencies with known amplitudes. Such a signal can be represented as $F(u)$, where:

$F(u)=0$ for $|u|>u_{cut\ off}$;

$F(u)=\{U\}$ for $|u|<u_{cut\ off}$, and (1)

$\{U\}$ represents some set of values.

If, in addition, it is known that in the signal space the signal is confined to a finite domain, namely, if the signal is represented as $F(v)$, then:

$F(v)=0$ for $|v|>v_{cut\ off}$;

$F(v)=$non-zero for $|v|<v_{cut\ off}$; (2)

These two charcteristics can be used to define two corresponding sets. The first set, $S_1$, is the set of all signals confined to the appropriate finite extent. The second set, $S_2$, is the set of all signals that have the given low frequency values $\{U\}$. Hence, the original signal which constitutes an initial approximation is defined by equation (1) and hence is in the first set $S_1$. The first projection is carried out by means of a Fourier transform to the signal space and imposes the appropriate signal space constraint, namely, truncating the signal so that the resultant signal is confined to the appropriate domain and hence belongs to the second set $S_2$.

As represented by the arrows, the resultant signal is projected onto $S_1$ by means of a Fourier transform and then the appropriate frequency space constraints are imposed, namely, the low frequencies defined by $|u|<u_{cut\ off}$ are replaced by the frequencies $\{U\}$ while the other frequencies are retained. This procedure is carried out iteratively until a satisfactory convergence to the intersection point 18 of the two sets, is obtained.

For color images the POCS method may be based on constraints stemming from correlation which exists between the color separations.

The POCS processed signal, $X_{pocs}$, is transferred to the post-POCS processor 14 that performs a signal processing procedure to further enhance the signal, such as high pass filtering to enhance the high frequency components of the signal. The post-POCS processor 14 may make use of some, or all of the characteristics of any of the other circuits in the system. The post-POCS processed signal, $X_p$ is applied to an output device 16, which may be embodied by a recording medium, a printer, a computer monitor, or the like.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. In a method for producing enhanced lossy signals from an irreversible compression first processor in which there is performed irreversible compression encoding of input signals and subsequently said enhanced signals are transferred to a second processor for performing compression decoding thereof, the improvement comprising:

defining at least two sets of signals, wherein each set contains constraints including a multibit signal having a selected property of the decoded compressed signals;

feeding the decoded signals representative of different colors to a third processor, and processing said decoded signals by the method of projection onto convex sets, thereby imposing conformity to said sets of signals.

2. The method as claimed in claim 1, further comprising the step of pre-processing the compression-decoded signals prior to feeding the signals to said second compressor.

3. The method as claimed in claim 1, further comprising the step of post-processing the signals of said third processor for further enhancement of the signals.

4. The method as claimed in claim 3, wherein said post-processing signals are applied to an output device selected from devices for recording, printing or monitoring of said output signals.

5. The system as claimed in claim 1, further comprising a post-second processor for processing output signals of said third processor for a further enhancement thereof.

6. The system as claimed in claim 1, further comprising a recording or displaying device at least indirectly receiving signals from the output of said third processor.

7. In a system for producing enhanced lossy signals from an irreversible compression first processor in which there is performed irreversible compression encoding of input signals and subsequently said enhanced signals are transferred to a second processor for performing compression decoding thereof, the improvement comprising:

means for defining at least two sets of signals, each set containing constraints including a multibit signal having a known property of the decoded compressed signals, and a third processor connected for receiving said sets of signals from said second processor and being of the kind which processes signals by the method of projection onto convex sets, thereby imposing conformity to said sets of signals.

8. The system as claimed in claim 7, further comprising circuit means for pre-processing the compression-decoded signals prior to feeding the signals to said second processor.

9. In a method for producing enhanced signals from an irreversible compression first processor in which there is performed irreversible compression encoding of input signals and subsequently said enhanced signals are transferred to a second processor for performing compression decoding thereof, the improvement comprising:

defining at least two sets of signals, wherein each set contains constraints having a selected property of the decoded compressed signals and said sets are based on constraints representing correlation between separations of a color image;

feeding the decoded signals to a third processor, and processing said decoded signals by the method of projection onto convex sets, thereby imposing conformity to said sets of signals.

* * * * *